(12) United States Patent
Yerian et al.

(10) Patent No.: US 7,261,545 B2
(45) Date of Patent: Aug. 28, 2007

(54) POWDER PREHEATING

(75) Inventors: Dirk N. Yerian, Akron, OH (US);
James R. Nagy, Akron, OH (US);
Daniel J. Dimassa, Wooster, OH (US);
Carter J. Bailey, Akron, OH (US);
Robert W. Messner, Uniontown, OH (US); Keith A. Yerian, Doylestown, OH (US)

(73) Assignee: Chip Investments, LLC, Akron, OH (US)

( * ) Notice: Subject to any disclaimer, the term of this patent is extended or adjusted under 35 U.S.C. 154(b) by 206 days.

(21) Appl. No.: 10/716,307

(22) Filed: Nov. 18, 2003
(Under 37 CFR 1.47)

(65) Prior Publication Data

US 2005/0106279 A1 May 19, 2005

(51) Int. Cl.
*B01F 15/02* (2006.01)

(52) U.S. Cl. ............... 425/257; 425/145; 425/162; 366/133; 366/136; 366/137

(58) Field of Classification Search ............... 425/162, 425/256, 257, 587, 580, 582, 145; 366/136, 366/137, 133
See application file for complete search history.

(56) References Cited

U.S. PATENT DOCUMENTS

| | | | |
|---|---|---|---|
| 3,622,045 A | 11/1971 | Delaney, Jr. et al. | |
| 3,645,505 A * | 2/1972 | McLeod et al. | 366/160.3 |
| 3,661,485 A | 5/1972 | Arpajian et al. | |
| 3,741,699 A * | 6/1973 | Arpajian et al. | 425/145 |
| 3,891,372 A * | 6/1975 | Takiura | 425/543 |
| 4,577,078 A | 3/1986 | Noda et al. | |
| 4,580,698 A * | 4/1986 | Ladt et al. | 222/55 |
| 4,684,488 A * | 8/1987 | Rudolph | 264/411 |
| 4,913,641 A | 4/1990 | Zahradnik | |
| 4,998,872 A | 3/1991 | Funakubo et al. | |
| 5,286,437 A * | 2/1994 | Severiens | 264/211 |
| 5,516,271 A | 5/1996 | Swenor et al. | |
| 5,529,474 A | 6/1996 | Goh et al. | |
| 5,593,707 A * | 1/1997 | Goe et al. | 425/257 |
| 5,802,961 A * | 9/1998 | Hay et al. | 99/406 |
| 5,836,721 A * | 11/1998 | Wallace | 406/75 |
| 6,380,517 B2 * | 4/2002 | Morgan | 219/389 |
| 6,589,470 B2 | 7/2003 | Fried et al. | |
| 6,824,374 B1 * | 11/2004 | Seta et al. | 425/145 |

* cited by examiner

*Primary Examiner*—Yogendra N. Gupta
*Assistant Examiner*—Maria Veronica Ewald
(74) *Attorney, Agent, or Firm*—Pearne & Gordon LLP

(57) ABSTRACT

Powdered starting material utilized for molding (e.g., rotational molding, injection molding, blow molding), extrusion, and the like can be preheated to reduce the time required to complete the processing of the material. After being preheated to a temperature below a melting temperature of the powder, the powder is transferred to a processing station. For example, in a rotational molding system, the preheated powder is transferred to a mold, where the preheated powder is melted and the mold is rotated such that the molten material adheres to the walls of the mold. After obtaining a desired distribution of the material over the walls of the mold, the temperature of the mold is decreased as rotation of the mold continues. When the article is sufficiently cooled, the article is removed from the mold.

21 Claims, 10 Drawing Sheets

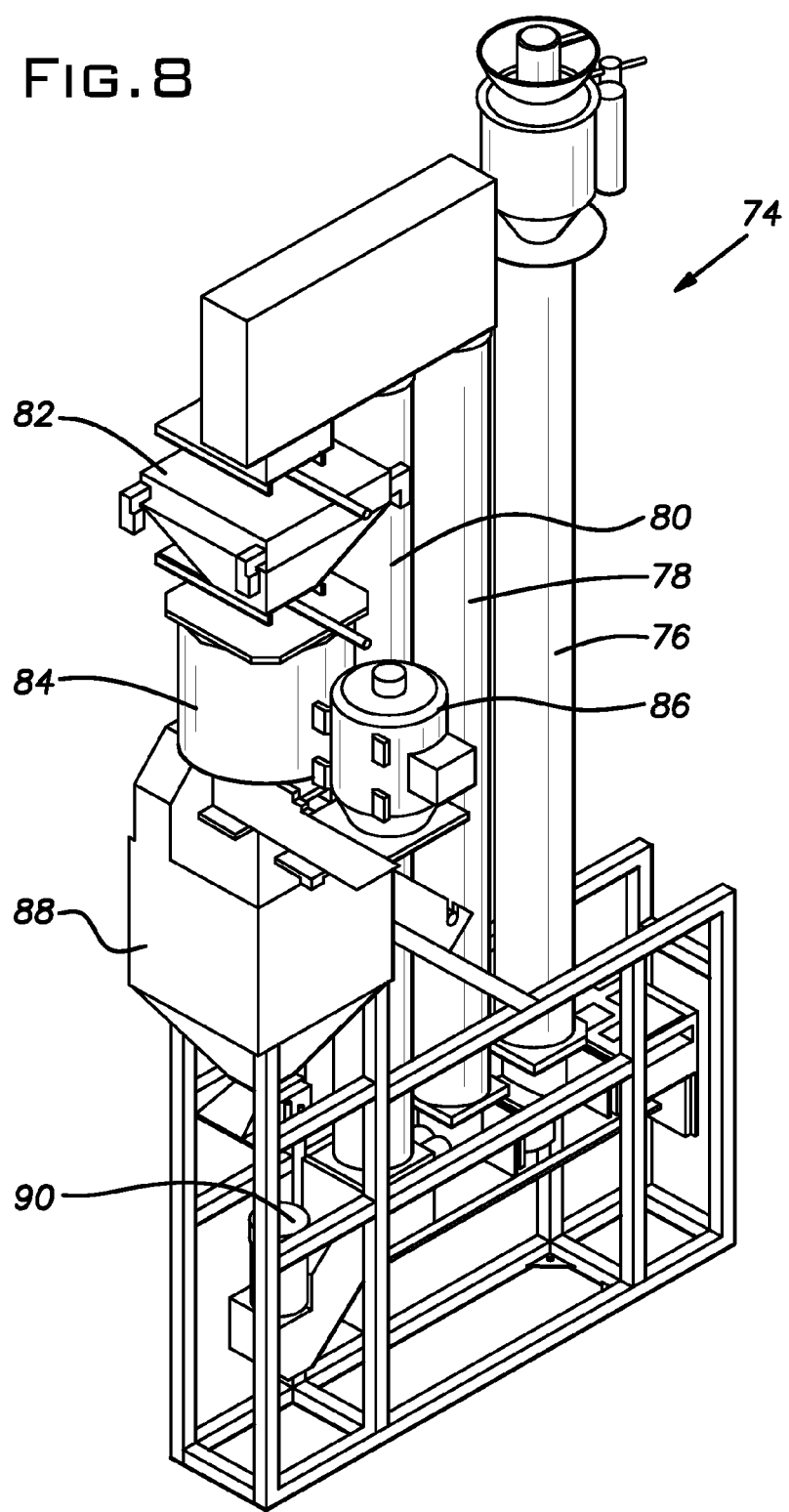

POWDER PREHEATING

FIELD OF THE INVENTION

The present invention relates preheating materials and more particularly, to systems and methods for preheating powder utilized in plastic and/or metal processing systems, such as molding, extrusion, etc.

BACKGROUND OF THE INVENTION

Rotational molding, also referred to as rotomolding, is a widely used process to produce hollow articles such as toys, sporting equipment, containers, water tanks, etc. The rotomolding process includes introducing a known amount of plastic in powder form into a hollow, shell-like mold. The mold is rotated about two or more principal axes at relatively low speeds as it is heated so that the plastic enclosed in the mold adheres to and forms a monolithic layer against the mold surface. When the mold rotates in the oven, the oven's metal wall becomes hot and the surface of the powder particles becomes tacky. The particles stick to the mold wall and to each other, thus building up a loose powdery mass against the mold wall. A major portion of the cycle is then taken up in sintering the loose powdery mass until it is a homogeneous melt. The mold rotation continues during the cooling phase so that the plastic retains its desired shape as it solidifies. When the plastic is sufficiently rigid, the cooling and mold rotation is stopped to allow the removal of the plastic product from the mold. At this stage, the cyclic process may be repeated.

In a typical rotational molding process, room temperature plastic is placed in a mold and the whole assembly is heated to a melting temperature for the plastic. Both the mold and the plastic are then cooled back to room temperature. Thus, the rotational molding process requires the mold to both heat and cool the plastic. Generally, the only controls on the process are oven temperature, time in the oven, and rate of cooling. Each of these variables has a major effect on properties of an end product. If the oven time is too short, or the oven temperature is too low, then fusing and consolidation of the plastic will not be complete. This results in low strength, low stiffness, and a lack of toughness in the end product. Conversely, if the plastic is overheated then degradation processes will occur in the plastic, which results in brittleness. In a commercial production environment, the optimum "cooking" time for the plastic in the oven has often been established by trial and error. Moreover, it is noted that once a cooking time has been established for a process, the cooking time is subject to change based upon a change in the ambient room temperature.

It is noted that the disadvantages discussed herein with regards to a rotomolding process are also applicable to other powder processing applications, such as injection molding, blow molding, extrusion, etc.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with a first aspect of the present invention, a material processing system is provided. The system includes: a preheating station to heat a powdered material to a predetermined temperature, the predetermined temperature being below the melting point of the powdered material; and a processing station to process the preheated powdered material, the preheated powdered material facilitating at least one of improved cycle time of the processing station, improved quality of a finished product, and decreased operation cost of the processing station.

In accordance with another aspect of the present invention, a powder preheating system is provided. The powder preheating system includes: a first heated tube having a vertical auger screw for lifting a powdered material upwards through the tube while heating the powdered material to a predetermined temperature; and a hopper coupled to the first heated tube and staged for dispensing the heated powdered material.

In accordance with yet another aspect of the present invention, a powder preheating system is provided which includes: at least one heated tube for heating powdered material flowing through the tube; means for feeding the powdered material from a storage bin to the at least one heated tube; and means for dispensing the heated powdered material from the at least one heated tube.

To the accomplishment of the foregoing and related ends, the invention then, comprises the features hereinafter fully described. The following description and the annexed drawings set forth in detail certain illustrative aspects of the invention. These aspects are indicative, however, of but a few of the various ways in which the principles of the invention may be employed and the present invention is intended to include all such aspects and their equivalents. Other object, advantages and novel features of the invention will become apparent from the following detailed description of the invention when considered in conjunction with the drawings.

BRIEF DESCRIPTION OF THE DRAWINGS

FIG. 8 illustrates a powder preheating and coloring system in accordance with an aspect of the present invention.

DETAILED DESCRIPTION OF THE INVENTION

Figure 1:
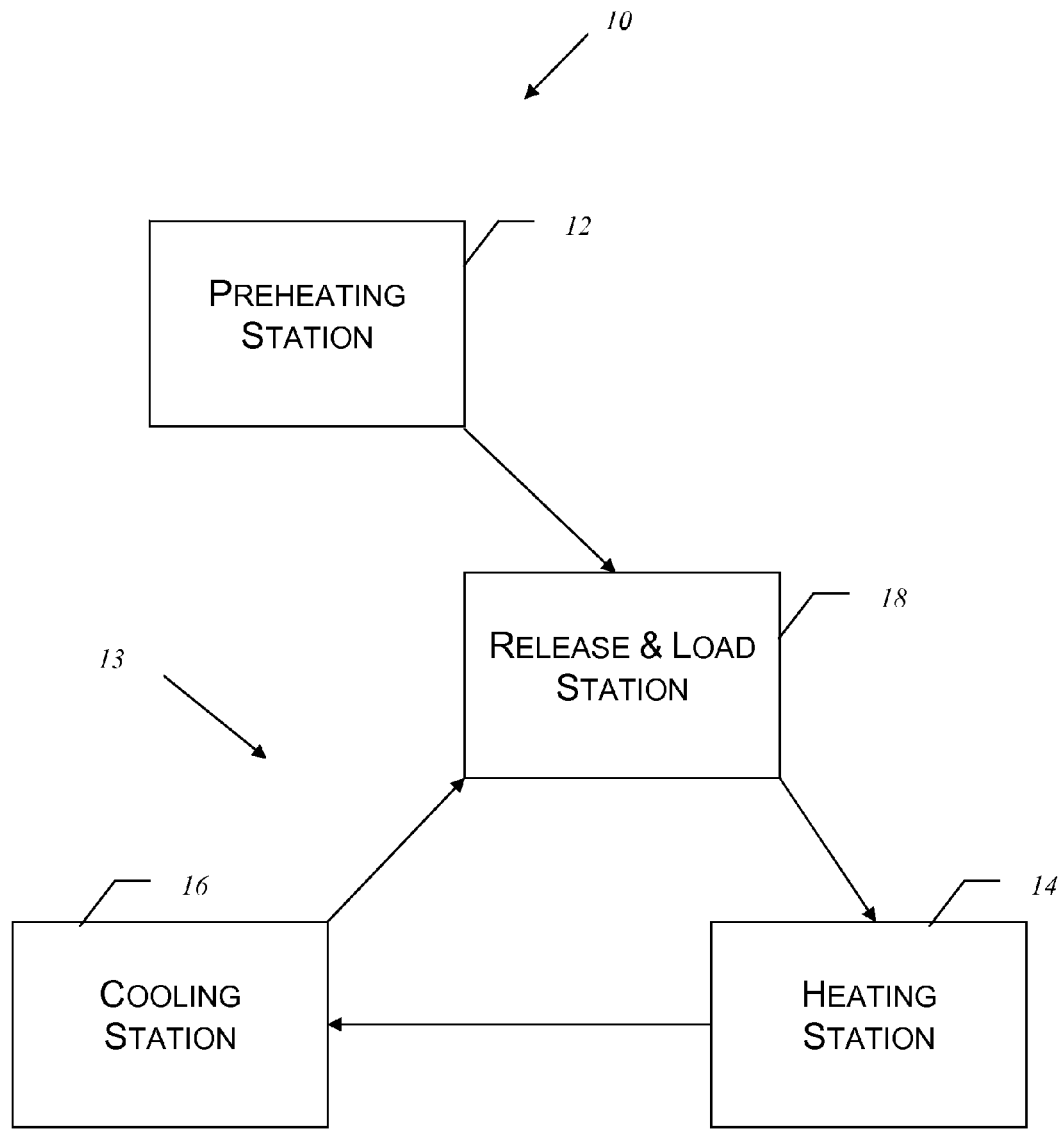
FIG. 1 illustrates a schematic diagram of a material processing system in accordance with an aspect of the present invention.

The present invention provides systems and methods for preheating powdered starting material for powder processing applications, such as molding, extrusion, etc. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the reading of the drawings. In the following description, for purposes of explanation, numerous specific details are set forth in order to provide a thorough understanding of the present invention. It may be evident, however, that the present invention may be practiced without these specific details.

Referring initially to FIG. 1, a material processing system 10 is illustrated in accordance with an aspect of the present invention. The system 10 includes a preheating station 12 in which a powdered starting material is heated to a predetermined temperature. Preheating the powdered starting material can reduce the cycle time required to complete the material processing by reducing the amount of time required for a heating step of the process. Moreover, the amount of heat energy required to melt the material can be minimized, thereby reducing cost associated with heating the plastic. Accordingly, the preheating station 12 facilitates increased productivity and decreased cost. After being preheated to the predetermined temperature, the powder is transferred to a processing station 13 where the preheated powder is further processed.

The processing station 13 will be described herein as a rotational molding, or rotomolding, station. However, it is to be appreciated that the processing station 13 can be any type of molding station (e.g., injection molding, blow molding), an extrusion station, or any other suitable material processing station. Preheated powder from the preheating station 12 is transferred to a mold at release and load station 18. The filled mold is then heated at a heating station 14 while being rotated about two or more axes. The rotation of the mold facilitates displacement of the material to cover the walls of the mold. Because the powdered starting material is preheated prior to heating the mold and powder assembly, the cooking time associated with the heating station 14 can be more standardized for each process as the cooking time does not vary as much with respect to the ambient room temperature. After obtaining the desired distribution of the material over the walls of the mold, the temperature of the mold is decreased at a cooling station 16 as rotation of the mold continues. The decrease in temperature allows the molten material to solidify in the shape of the mold cavity. When the article is sufficiently cooled, the article is removed from the mold at the release and load station 18 and the process is repeated.

In a conventional molding process, cold, or ambient temperature, starting material is placed in a hot mold. Upon contact, the cold material cools the surface area of the mold, which can create a cold spot when it enters the heat chamber. This results in inconsistencies in wall thickness in the resultant part. Typically, an operator would utilize a propane torch or some other method to reheat the mold at the cold spot, which thereby imputes a human element into an otherwise automated system or process. Additionally, if the mold is not heated enough or over heated, scrap parts can result. Thus, the present invention of preheating the starting material prior to placing the material in the mold creates a stable and substantially automated process or system that requires no human intervention. Moreover, scrap is substantially mitigated by the present invention.

As an additional advantage, when employing PET and PVC material, such material must run through a dryer to remove moisture as any water is the material can adversely affect the molding of the product. The present invention can perform the same function as the dryer and result in cycle reduction as well.

Figure 2:
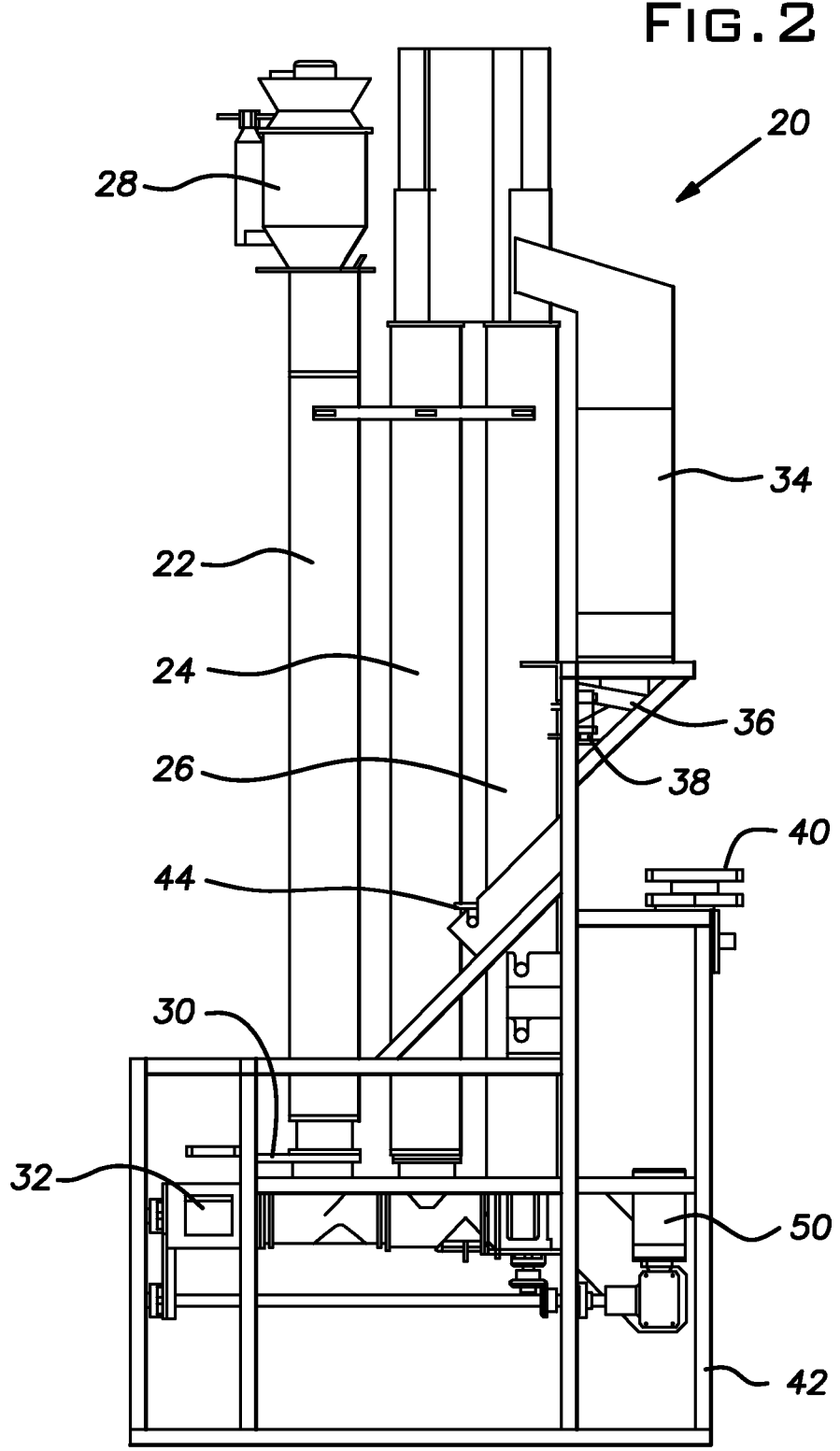
FIG. 2 illustrates a powder preheating system in accordance with an aspect of the present invention.

Turning now to FIG. 2, an example of a powder preheating system 20 is depicted. The system 20 comprises first, second, and third water-jacketed tubes 22, 24, and 26 for preheating a powdered starting material (not shown) flowing through the tubes 22, 24, and 26. The powdered material can comprise thermoplastics, thermosetting materials, and the like. The water jackets substantially surround an outer periphery portion of the tubes 22, 24, and 26 such that a temperature of water in the water jackets can be transferred to the powder flowing through the tubes 22, 24, and 26. A stand-alone gas fired boiler (not shown) can be employed as a heat source for the water. It is to be appreciated that any other suitable method can be employed for heating the powdered material within the tubes 22, 24, and 26. For example, a heating coil (not shown) can be wrapped around an outer periphery portion of the tubes 22, 24, and 26 to heat the contents of the tubes 22, 24, and 26. As another example, the water jackets or any suitable structure can include any suitable liquid and/or gas, such as oil and air, to heat the powdered material.

The first water jacketed tube 22 can be a storage tube utilized to amass the powdered starting material. The water jacket is utilized to heat the powder contained within the storage tube 22. However, it is to be appreciated that the storage tube 22 can be employed without a water jacket, thereby storing the powdered material at room temperature. A vacuum conveyor 28 can be mounted to a top portion of the storage tube 22. The vacuum conveyor 28 draws powder from a storage container (not shown), such as a gaylord container, into the storage tube 22 of the preheating system 20. However, it is to be appreciated that the powdered starting material can be moved to the storage tube 22 via any other suitable method, e.g., manually feeding the powdered material to the storage tube 22. A sensor (not shown) can be located within the storage tube 22 to monitor an amount of powdered starting material residing in the storage tube 22. Thus, the storage tube 22 can be maintained at a predetermined level during the preheating process.

The powder is contained within the storage tube 22 via a normally closed gate 30 located at a bottom portion of the storage tube 22. When more powder is needed, a pneumatic cylinder operates to open the normally closed gate 30 such that the powder feeds through the gate 30 into a horizontal feed screw assembly 32, which will be described in further detail below. To indicate when more powder is needed from the storage tube 22, one or more sensors (not shown) may be employed within the second and/or third tube 24, 26 to indicate when the powder level is low. The sensor(s) could take the form of paired sensors, for example, that comprise a capacitor, the capacitance of which changes with the presence or absence of the powder between them. The sensor(s) can be located at a level within the second and/or third tubes 24, 26 indicative of a minimum permissible powder level.

From the storage tube 22, the powder moves horizontally through the feed screw assembly 32 to the third water-jacketed tube 26. The third water-jacketed tube 26 includes a vertical auger screw that operates to lift the powder upwards through the tube 26. The vertical auger screw also facilitates agitation of the powder, which enhances heat transfer from the heated water jacket. Thus, the powder within the tube 26 is substantially evenly heated throughout. When the powder reaches a top portion of the vertical auger screw tube 26, the powder can fall into a hopper 34, which is staged for dispensing the preheated powder. A chute 36 located at a bottom portion of the hopper 34 operates to hold the powder within the hopper 34 until it is needed. When preheated powder is desired from the preheating system 20, a vibration mechanism 38 operatively connected to the chute 36 creates vibrations within the chute 36 to facilitate material flow. As the chute 36 is vibrated, powder is discharged from the hopper 34 onto a scale 40. The scale 40 weighs the discharged powder. When a predetermined amount of powder has been discharged, the vibration mechanism 38 stops. The preheated powder is then transferred from the preheating system 20 to a mold. It is to be appreciated that any suitable means for dispensing the preheated powder can be utilized. For example, the dispensing means can include a screw feeder, an open shut gate, etc.

The powder continues to fall from the vertical auger screw tube 26 into the hopper 34 until the hopper 34 is filled with the preheated powder. When the hopper 34 is filled, the powder from the vertical auger screw tube 26 falls into the second water-jacketed tube 24. The second water-jacketed tube 24 is employed for recirculating the powder between the second and third tubes 24 and 26. Recirculating the powder facilitates flow and heating of the powder. The powder moves downwards through the second tube 24 to the horizontal feed screw assembly 32, which in turn, moves the powder to the vertical auger screw tube 26.

The powder preheating system 20 can be supported by a frame 42 and can include a pivot point 44. Thus, the water-jacketed tubes and hopper assembly can be rotated approximately ninety degrees about the pivot point 44 for maintenance, storage and/or shipping.

Figure 3:
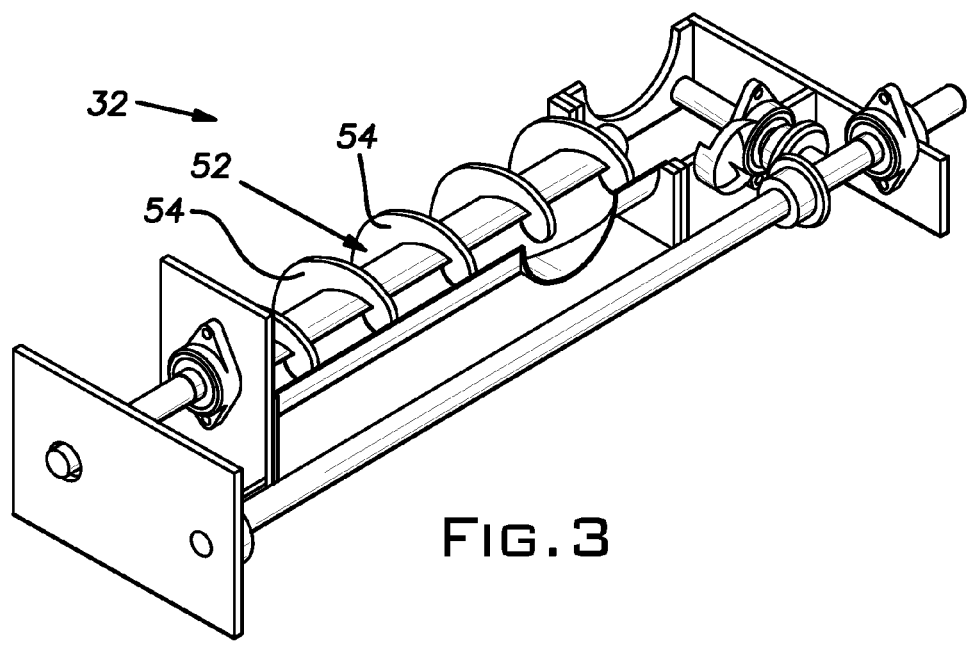
FIG. 3 illustrates a horizontal auger screw in accordance with an aspect of the present invention.
Figure 4:
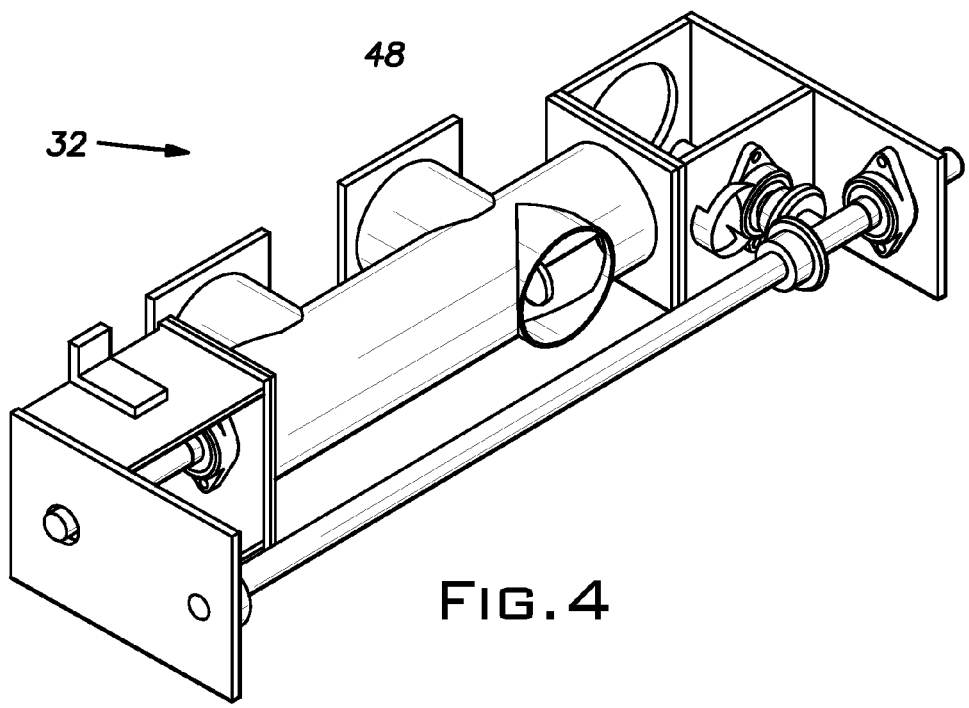
FIG. 4 illustrates a horizontal auger screw in accordance with an aspect of the present invention.

Turning now to FIGS. 3 and 4, the horizontal feed screw assembly 32 is illustrated in further detail in accordance with an aspect of the present invention. As described above, the horizontal feed screw assembly 32 is employed to convey powdered material from the storage tube 22 and the recirculating tube 24 to the vertical auger screw tube 26. The horizontal feed screw assembly 32 comprises a rotatable auger screw 46 located within a substantially hollow tube 48. The auger screw 46 is a spiral shaped mechanical part that pushes the powder through the tube 48 by direct mechanical contact. The auger screw 46 is coupled to a drive assembly 50 (FIG. 2), which operates to rotate the auger screw 46 within the tube 48. It is to be appreciated that the auger screw 46 can be rotatably driven by any suitable mechanism.

Figure 5:
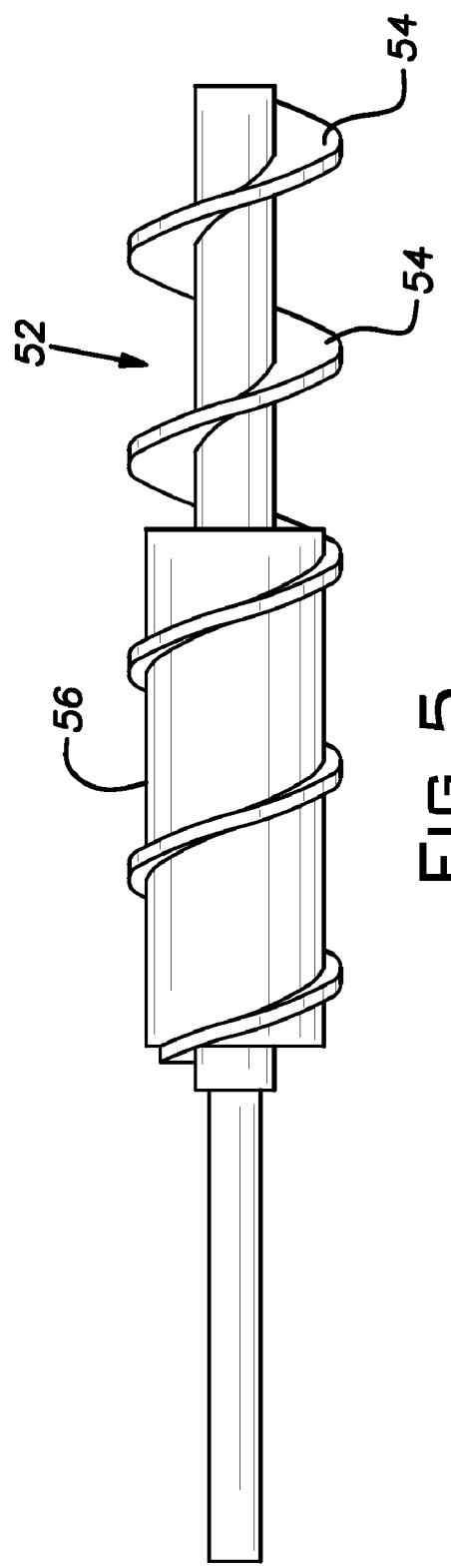
FIG. 5 illustrates a horizontal auger screw in accordance with an aspect of the present invention.

The horizontal feed screw assembly 32 can regulate an amount of powdered material that is fed from the storage tube 22 into the vertical auger screw tube 26 and recirculating tube 24. The amount of powdered material that flows from the storage tube 22 is proportional to the area 52 located between twisted blades 54 of the auger screw 46. However, if the temperature of the powdered material in the storage tube 22 is still relatively cold and too much material is introduced at once into the vertical auger screw tube 26 and the recirculating tube 24, a cold spot may be created in the circulating material. Accordingly, a flight restrictor 56 can be coupled to the auger screw, as shown in FIG. 5. The flight restrictor 56 restricts the amount of powder that can be dispensed from the storage tube 22 into the circulating material. However, any method of slowly metering material from a storage container into the heating chamber can be employed and is contemplated as falling within the scope of the present invention.

It is to be appreciated that any other mechanism for moving the powdered material between the first, second, and third water-jacketed tubes 22, 24, and 26 can be employed and is contemplated as falling within the scope of the present invention. For instance, a pneumatic conveyor can be employed in place of the horizontal feed screw assembly 32.

Figure 6:
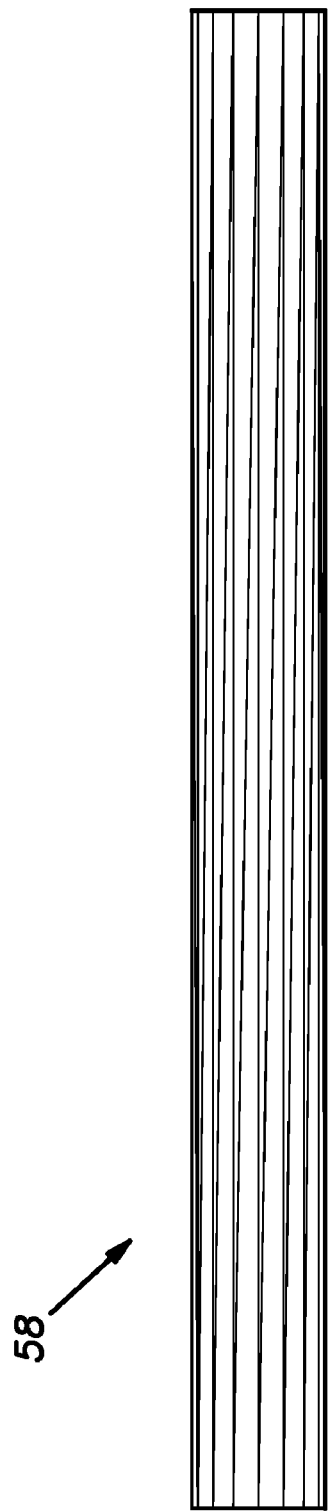
FIG. 6 illustrates a water jacket in accordance with an aspect of the present invention.

FIG. 6 depicts a water jacket 58 in accordance with an aspect of the present invention. The water jacket 58 has an inner diameter that corresponds with an outer diameter of a corresponding tube or pipe. The water jacket 58 is baffled such that water can be evenly distributed around a circumference of the pipe, thereby facilitating evenly distributed heating of the powdered material flowing through the pipe. A water boiler is employed to heat the water to a predetermined temperature. For example, the water can be heated to temperature about ten percent below the melting temperature of the powdered material. It is to be appreciated that the preheating temperature may vary depending upon the type of powdered starting material that is utilized in the system 20.

Figures 7, 9:
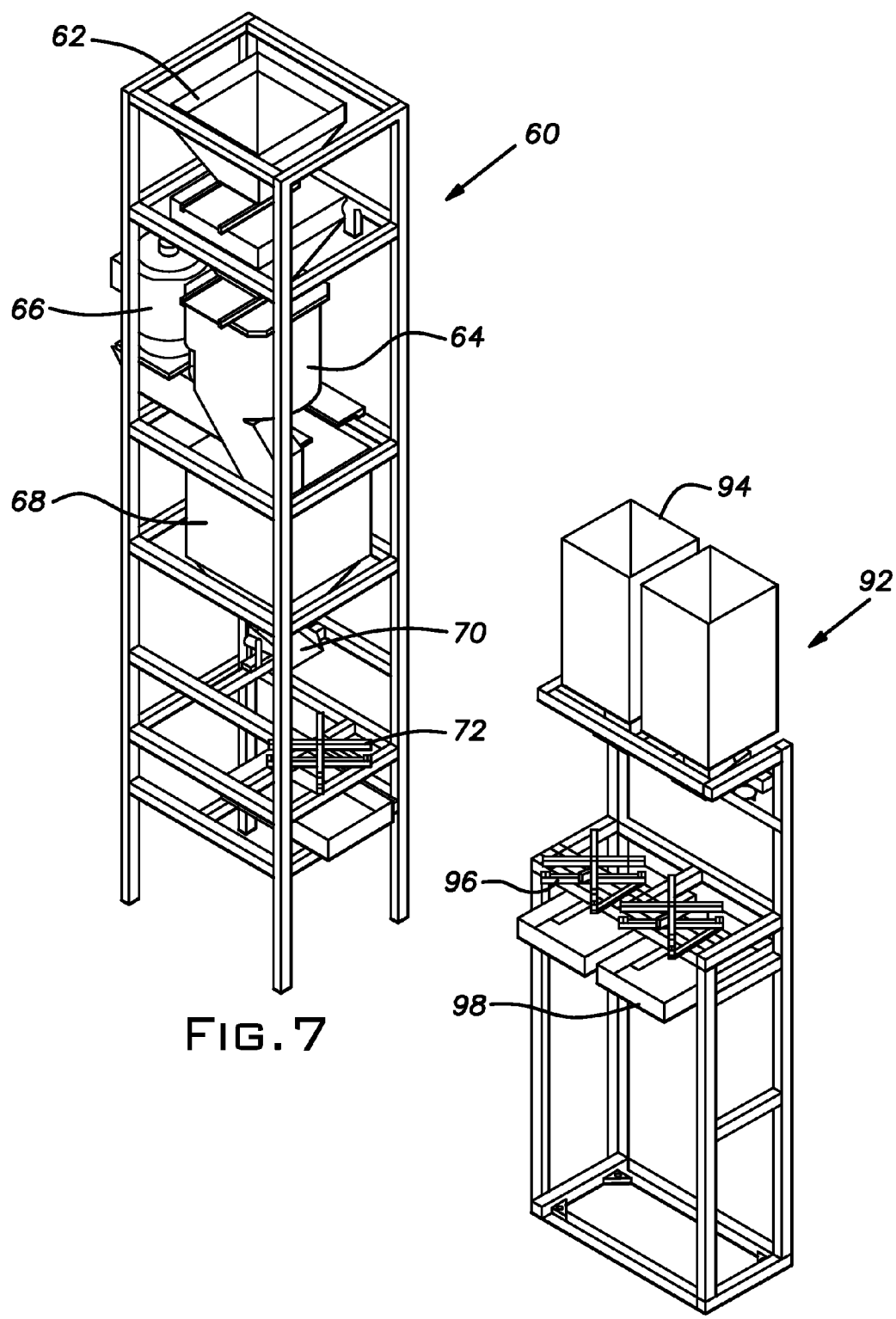
FIG. 7 illustrates a powder coloring system in accordance with an aspect of the present invention.
FIG. 9 illustrates a powder dispensing system in accordance with an aspect of the present invention.

FIG. 7 illustrates an example of a powder coloring system 60. Traditionally, powdered plastics have been colored by tumble blending or high intensity blending in large batch sizes. The powdered plastic is blended with a solid colorant or additive concentrate such as a coloring powder. The blended material is then fed into an extruder or molding machine or dumped directly into the mold where the resin and the colorant are plasticized and the colorant is incorporated into the molten plastic. However, such methods have a number of drawbacks. In many cases, a solid colorant or additive concentrate does not uniformly mix with plastic, or it does not disperse uniformly during molding. Further, solid colorants can segregate from the powdered plastic during pre-molding handling because of particle size or specific gravity differences. Further still, coloring powder in large batches creates a high inventory of unused colored powders. Thus, the present invention employs liquid and/or dry color concentrates for coloring preheated powdered material. Mixing the color concentrates into the powder after heating facilitates penetration of the color into the resin for proper blending. Additionally, or alternatively, the present invention also provides a powder coloring system that can utilize a just-in-time scenario to minimize inventory. The powder coloring system blends small amounts of color concentrates into predetermined amounts of powder, the predetermined amounts of powder being based upon cycle and/or daily requirements.

The powder coloring system 60 comprises first hopper 62 where powdered starting material is introduced to the coloring system 60. Optionally, a vacuum conveyor (not shown) can be mounted to a top portion of the coloring system 60 to draw powder from a storage container (not shown), such as a gaylord container, into the coloring system 60. The first hopper 62 releases powder onto a first scale 63. When the first scale 63 has determined that a predetermined amount of powder has been released, the first hopper 62 discontinues the dispensing of the powder and the powder is moved into a mixer 64. The mixer 64 operates to rotatably mix the powder while a predetermined amount of liquid and/or dry color concentrates are metered into the mixer 64 from a pigment receptacle 66. The pigment receptacle 66 can contain one color concentrate or a plurality of different color concentrates. An operator can select a desired color to be released into the mixer. The resultant colored powder is then dispensed into a second hopper 68. A vibration chute 70 is located at a bottom portion of the second hopper 68 to mete out the colored powder onto a second scale 72. The second scale 72 weighs the discharged colored powder. When a predetermined amount of colored powder has been discharged, the vibration chute 70 stops. The powder coloring system 60 can be utilized with cold, or ambient room temperature, powder and pre-heated powder.

Moreover, a powder coloring system, such as the one described with respect to FIG. 7, can be integrated with a powder preheating system, such as the one described with respect to FIG. 2. Accordingly, FIG. 8 depicts an example of an integral powder preheating and coloring system 74. The system 74 includes three water jacketed tubes: a storage tube 76, a recirculating tube 78, and a vertical auger screw tube 80 for heating and circulating powdered starting material. When the powder is sufficiently heated, the powder is moved to a first hopper 82, which dispenses the heated powder into a mixer 84. One or more liquid pigments are metered into the mixer 84 from a receptacle 86 to color the heated powder to a desired hue. The colored heated powder is then discharged into a second hopper 88. The powder is released from the second hopper 88 onto a scale 90, in which a predetermined amount of powder is measured and then transferred to a mold. Thus, the powdered material can be economically colored on a per order basis rather than employing material colored prior to heating.

Alternatively, or additionally, the powder coloring system can include a water jacket that substantially surrounds a blender of the powder coloring system. Water-jacketing the blender can mitigate the need for the preheat system as the blender itself acts as a preheat chamber. The water-jacketed blender can also be employed in conjunction with a preheat system.

FIG. 9 illustrates a powder dispensing system 92 in accordance with an aspect of the present invention. The powder dispensing system 92 can be coupled to the powder preheating system 20 or can be employed as a stand-alone station. The system 92 comprises one or more hoppers 94 for holding powdered starting material. The hoppers 94 can be coupled to vibration chutes or any suitable dispensing mechanism such that the powdered material can be dispensed from the hoppers 94 onto one or more scales 96. Trays 98 may be provided under the scales to catch any excess powder.

Figure 10:
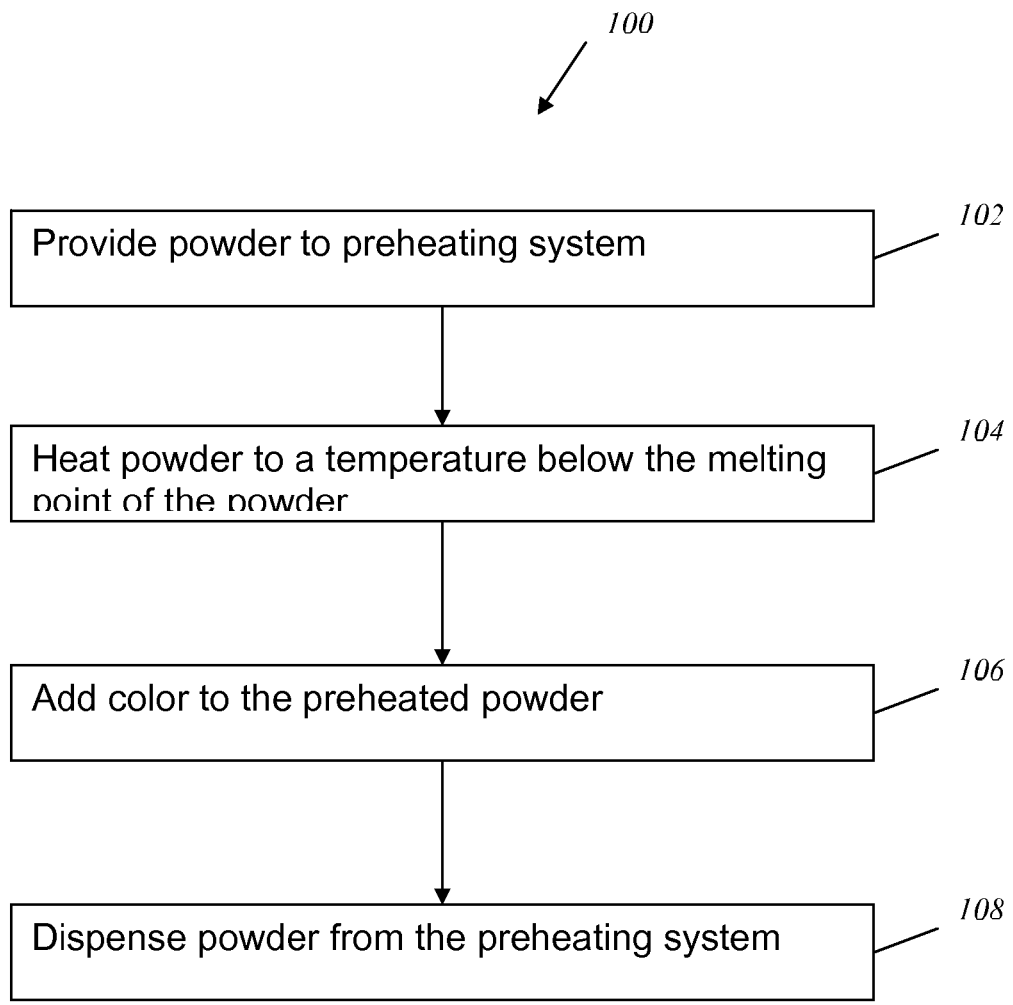
FIG. 10 illustrates a methodology for preheating a powdered material in accordance with an aspect of the present invention.

In view of the foregoing structural and functional features described above, a methodology in accordance with various aspects of the present invention will be better appreciated with reference to FIG. 10. While, for purposes of simplicity of explanation, the methodology of FIG. 10 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 10 illustrates a methodology for preheating a powdered material. The methodology begins at 100 in which cold, or room temperature, powder is supplied to a preheating system. At 102, the powder is heated to a temperature below a melting temperature of the powder. The powder can be heated via a method of rapidly circulating the powder through heated tubes. A color can be added to the heated powder at 104. Then, at 106, upon receiving instructions, e.g., from a portable electronic device, a specified amount of heated powder is dispensed from the preheating system. The powder can then be taken to a mold for subsequent heating and molding of the powder.

It is to be appreciated that of the systems described herein can be operated via a plurality of methods. For example, a laptop computer or personal digital assistant could be employed to wirelessly send instructions to the system to dispense a specified amount of preheated powder of a specified color.

Figure 11:
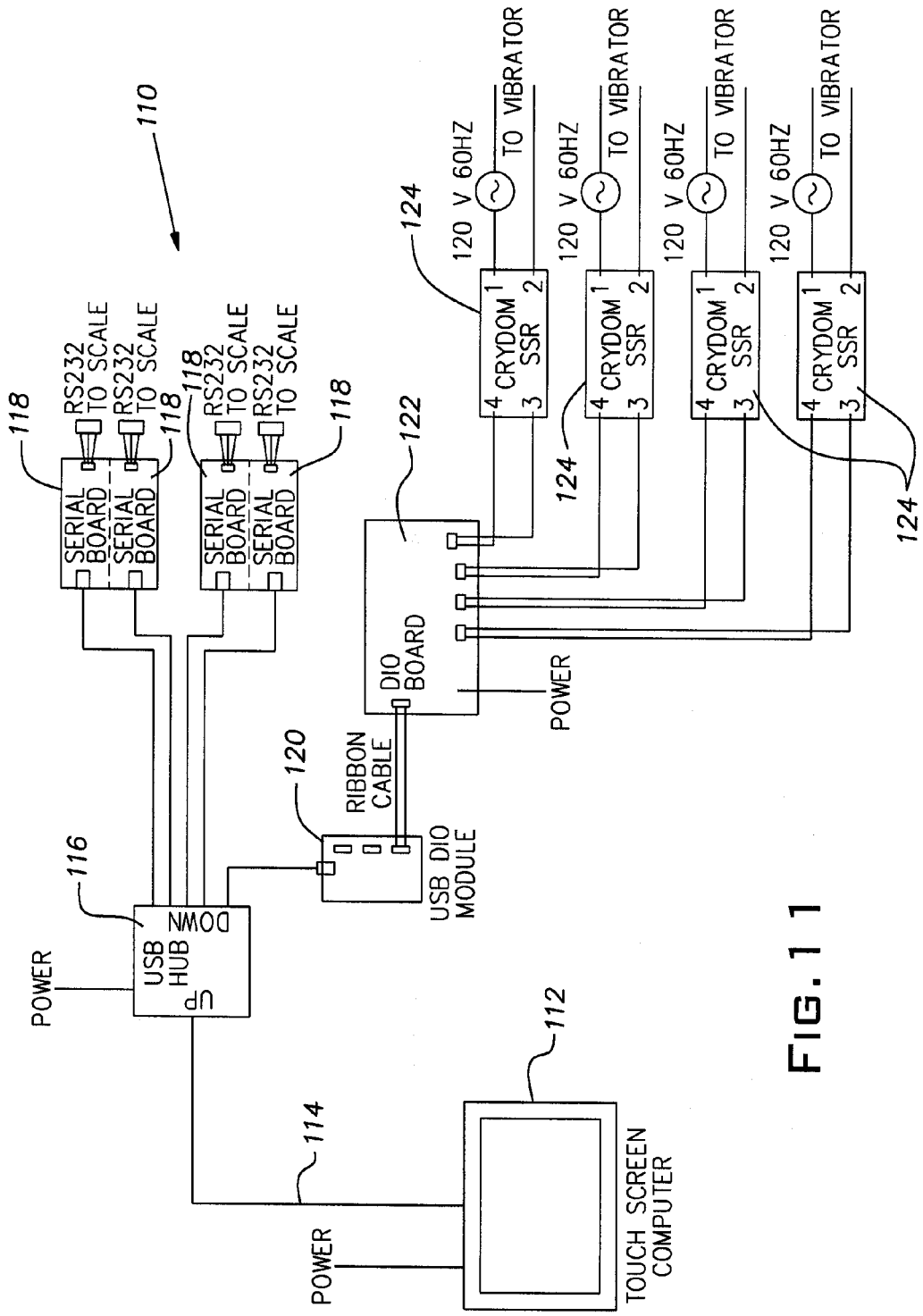
FIG. 11 illustrates a control system for a vibration mechanism in accordance with an aspect of the present invention.

Turning now to FIG. 11, an exemplary control system 110 for dispensing a specified amount of powder is depicted. The control system 110 includes the hardware interface between control software and scale inputs and vibrator outputs for a vibratory feeder system, or vibration mechanism. The interface can accommodate one or more stations, each station including a scale that provides weight readings to the software and a vibratory feeder that causes material to be dispensed by dropping into a container, or tote, sitting on the scale. Four stations are shown herein for ease of illustration; however, it is to be appreciated that any number of stations can be employed.

The control software runs on a computer 112. The computer 112 can include a touch screen to allow an operator to enter 'button presses' directly on the screen without additional user interface devices (e.g., mouse, keyboard, etc.). When the system is in operation after initial setup of the software, an operator places a tote on the scale. The software receives weight readings from the scale and, when the readings become stable, records the weight of the tote. The software then instructs the operator to select an amount (weight) of material to dispense from a set of pre-assigned weights on an array of button images on the touch screen. When the operator presses the desired button, the computer causes the vibrator to run, first at a higher amplitude, then at a lower amplitude, while monitoring the progress using the weight readings from the scale. The vibration amplitude controls the rate at which material is dropped into the tote. The software turns the vibrator off at the proper time to dispense the desired amount of material with good accuracy.

After the vibrator is off, the operator can leave the tote with the material on the scale for a few seconds while the scale stabilizes, so the software can use the final reading to make adjustments to maintain accuracy. The software advises the operator when the final reading has been recorded. If the operator removes the tote before the scale stabilizes, this adjustment in not made at this time.

Each scale can be connected to the interface via an RS232 cable, and each vibrator, by a 120 volt grounded power cord. The computer 112 can be connected to the interface via a single USB cable 114. The low voltage DC power cord for the computer may also be routed from the interface. The interface can be plugged into a 120 volt, 60 cycle standard power outlet to supply power to its internal devices, the vibrators, and the computer 112. The USB cable 114 couples the computer 112 to a powered USB hub 116. The USB hub 116 includes downstream connections numbering at least one more than the number of stations controlled. Power for the hub 116 can be provided from a low voltage DC power supply provided with the hub 116.

Each station includes a serial board 118. The serial board 118 is employed to convert between USB and RS232 protocols to provide communication with a scale. The serial boards 118 are powered by the USB hub 116. A single USBIO24 module 120, providing up to 24 digital inputs or outputs to the software via a single USB "function", e.g. device. The USBIO24 module 120 can also be powered by the USB hub 116. The USBIO24 module 120 is coupled to a single DIO Board 122 for up to four stations. The DIO board 122 controls up to four vibrators, providing two positive DC voltage levels (as well as zero volts) to proportional power controller devices 124, which drive the vibrators. A low voltage (12 volts or more) unregulated DC power supply can supply power for the DIO board 122. A Crydom proportional power controller 10PCV2415, also called a solid state relay (SSR) 124, is provided for each station. These devices 124 modulate 120 volt, 60 cycle power to the vibrators according to the DC voltage levels they receive from the DIO Board 122. No additional power supply is needed.

It is to be appreciated that any powered USB compliant hub with a sufficient number of downstream ports can be utilized. If the power available over the USB bus from the particular computer used was not sufficient to power all of the USB devices attached, the power supply provided with the hub can be used.

Figure 12:
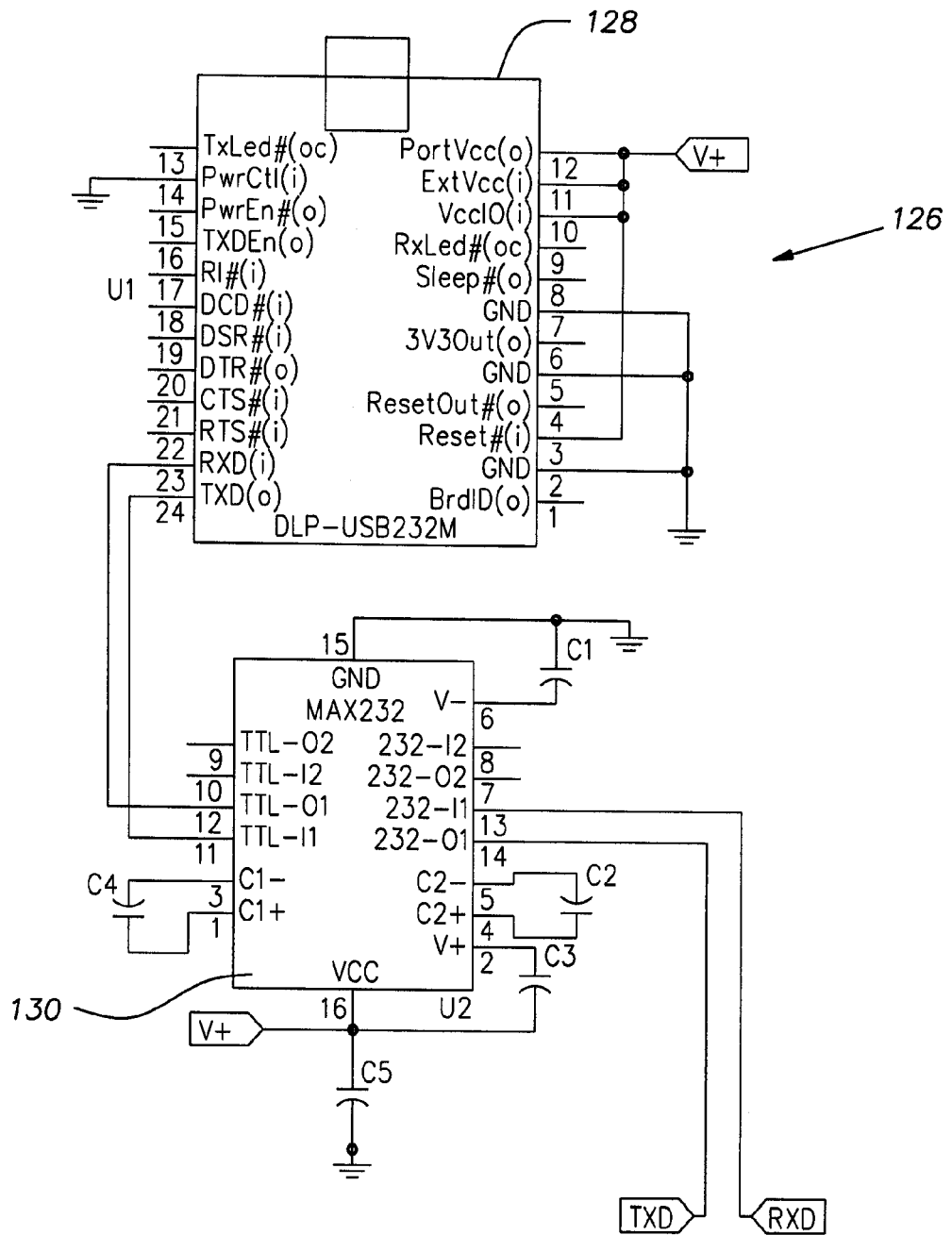
FIG. 12 illustrates a DIO module for the control system of FIG. 11 in accordance with an aspect of the present invention.

FIG. 12 illustrates a circuit 126 for the serial board. The circuit includes a DLP-USB232M USB to RS232 conversion module 128 to convert between USB and RS232 protocols, along with a MAX232 integrated circuit 130 and peripheral components to convert between the TTL level signals used by the USB module and the RS232-C voltage levels. Three signals from the serial board are wired to a 9-pin male D-subminiature connector, TXD to pin 2, RXD to pin 3, and ground to pin 5 of the connector. The USB connection of the module 128 goes through the hub 116 to the computer 112. The printed circuit board can include more than one serial board circuits thereon. The additional circuits on a board need not be populated with parts if it is not used, for example, if only one station is being controlled.

Turning back to FIG. 11, the USBIO24 module 120 provides a USB connection to 24 digital TTL level input/output pins. Each pin is individually assignable as either an input or an output. In the system illustrated herein, two pins are assigned as outputs for each station to control the vibrator for that station, and no digital inputs are used. One output pin supplies a signal for slow dispensing, and the other, for fast dispensing. When both pins are off, the vibrator is off, and no material is dispensed. If both pins were turned on simultaneously, material would be dispensed at a slightly faster rate. (The software does not activate both pins simultaneously.) The input/output pins on the module are grouped into three ports, with each port also supplying a ground and a +5 volt power pin. Each port accepts a 10-pin IDC cable connector. One port supplies the signals to connect to one DIO board 122, which then can control 4 vibrators. The USB connection of the module goes through the hub 116 to the computer 112.

Figure 13:
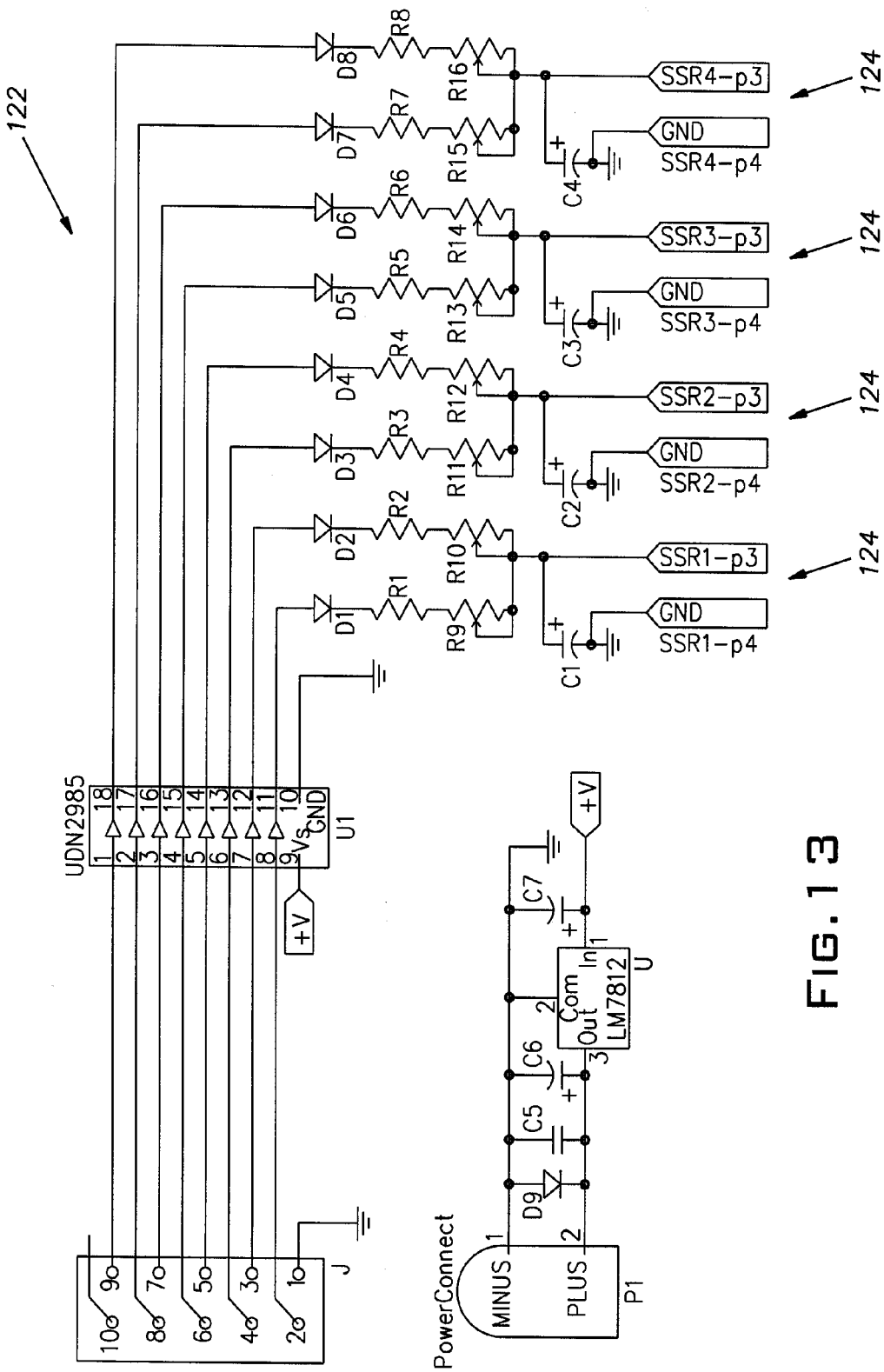
FIG. 13 illustrates a serial interface for the control system of FIG. 11 in accordance with an aspect of the present invention.

The DIO board 122 accepts two digital signals from the USBIO24 module 120 for each station's vibrator. Turning now to FIG. 13, the DIO board 122 is depicted in further detail. The DIO board 122 converts the two digital output bits for each station from the USBIO24 module 120 into two positive voltage levels sent to the proportional power controller 124. Up to four stations' vibrators can be controlled with one DIO board 122. The odd numbered resistances R1 thru R15 determine the lower voltages sent to the proportional power controllers 124 for the slower dispense rates at each station. The even numbered resistances R2 through R16 determine the higher voltages. R1, R3, R5, and R7 are each 460 ohms, while R2, R4, R6, and R8 are 220 ohms. R9 through R16 are 0 to 1K ohm potentiometers. This arrangement allows the lower voltages to be adjusted within a range of approximately 5 to 8.2 volts, and the higher, 5.5 to 9.2 volts. The final adjustments are made after the equipment is installed and the dispense rates can be measured.

The diodes D1 through D8 mitigate the signal voltages from the U1 integrated circuit slow rate lines from being fed back into its fast rate line outputs, and vice versa. The voltage regulator provides a constant supply voltage to U1, independent of the number of lines turned on at any given time. The power is supplied by a 12 volt DC unregulated power supply. The input connector of the DIO board 122 is connected through a 10-line IDC ribbon cable to a port of the USBIO24 module 120. Each of the four pairs of output lines are connected to the input terminals of a proportional power controller 124 for a station, with the ground line connected to terminal 4, and the signal line connected to terminal 3.

Each station uses a Crydom proportional power controller 10PCV2415, also called a solid state relay (SSR) 124. These devices modulate 120 volt, 60 cycle power to the vibrators according to the DC voltage levels they receive from the DIO board 122. The input control voltage range of these devices is 0 to 10 volts. At zero volts (and slightly above zero), they switch the output voltage off, essentially presenting an open circuit on the output terminals. As the voltage increases, they allow a higher percentage of the power voltage through the output terminal to the controlled devices. The input terminals of each proportional power controller 124 are connected to one output line pair of the DIO Board 122. The output terminals are connected the 120 volt, 60 cycle power in series with vibrator for a station.

It is to be appreciated that the powder preheating systems and methods of the subject invention, as described herein, have wide applicability. The systems and methods can be employed, for example, in numerous types of plastic processing applications, such as rotomolding systems, extrusion systems, compounding systems, injection molding, blow molding, and film casting systems, auxiliary processing, forming operations, perform manufacturing systems, etc. The powder preheating systems and methods can be utilized in any suitable application that can benefit from preheating plastics and any other contemplated materials.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A powder preheating system comprising:
    a first tube having an auger screw for moving a powdered material through the first tube;
    means for heating the first tube such that the powdered material moving through the first tube is heated to a predetermined temperature without melting the powdered material, the means for heating being coupled to an outer portion of the first heated tube;
    a hopper coupled to the first heated tube and staged for dispensing the heated powdered material; and a second heated tube coupled to the first heated tube to facilitate recirculating the powdered material between the first and second heated tubes wherein the first and second heated tubes are disposed so that the powdered material moves through the second tube in a direction generally opposite to a direction in which the powdered material moves through the first tube.

2. The powder preheating system of claim 1, wherein the first and second heated tubes are heated via first and second water jackets having heated water flowing therethrough, the first and second water jackets substantially surrounding a circumference of the first and second heated tubes.

3. The powder preheating system of claim 2, wherein the first and second water jackets are baffled to facilitate even distribution of the water around the circumference of the first and second heated tubes.

4. A powder preheating system comprising:
a first tube having an auger screw for moving a powdered material through the first tube;
means for heating the first tube such that the powdered material moving through the first tube is heated to a predetermined temperature without melting the powdered material, the means for heating being coupled to an outer portion of the first heated tube;
a hopper coupled to the first heated tube and staged for dispensing the heated powdered material;
a second heated tube coupled to the first heated tube to facilitate recirculating the powdered material between the first and second heated tubes; and
a third tube coupled to the first and second heated tubes to store the powdered material.

5. The powder preheating system of claim 4, wherein the first, second, and third tubes are coupled via a horizontal auger screw, the horizontal auger screw employed to move the powdered material between the first, second, and third tubes.

6. The powder preheating system of claim 5, wherein the horizontal auger screw includes a flight restrictor on a portion of the horizontal auger screw to control an amount of powdered material moving between the first, second, and third tubes.

7. The powder preheating system of claim 4, further comprising a normally closed gate coupled to a bottom portion of the third tube.

8. The powder preheating system of claim 4, wherein the third tube is heated via a water jacket substantially surrounding the third tube.

9. The powder preheating system of claim 4, further comprising a vacuum conveyor coupled to a top portion of the third tube to draw the powdered material from a storage container into the third tube.

10. The powder preheating system of claim 4, further comprising a sensor located in the third tube to sense when the powdered material is at or below a predetermined level.

11. The powder preheating system of claim 1, further comprising a sensor located in at least one of the first and second heated tubes to sense when the powdered material is at or below a predetermined level.

12. The powder preheating system of claim 1, further comprising a vibration chute coupled to the hopper to facilitate flow of the powdered material from the hopper.

13. The powder preheating system of claim 1, further comprising a first scale to measure an amount of powder to be colored.

14. The powder preheating system of claim 13, further comprising a second scale to measure an amount of powdered material dispensed from the hopper.

15. The powder preheating system of claim 1, further comprising a scale to measure an amount of powdered material dispensed from the hopper.

16. The powder preheating system of claim 1, further comprising a mixer to mix a pigment with the powdered material.

17. The powder preheating system of claim 16, further comprising a pigment receptacle to meter an amount of pigment into the mixer.

18. The powder preheating system of claim 1, wherein a portable electronic device is employed to operate the system.

19. The system according to claim 1, wherein the hopper has an inlet located at an outlet of the first heated tube and at an inlet of the second heated tube.

20. The system according to claim 1, wherein the powdered material is a material to be melted subsequent to heating in the system.

21. The system according to claim 1, wherein the powdered material is plastic to be molded.

* * * * *